2,902,510
2-SUBSTITUTED-2,6-DIMETHYL-7-OCTENES AND PROCESS FOR PREPARING SAME

Robert L. Webb, Jacksonville, Fla., assignor to The Glidden Company, Cleveland, Ohio, a corporation of Ohio No Drawing. Application April 9, 1956
Serial No. 576,795

13 Claims. (Cl. 260—489)

This invention is concerned with producing new unsaturated derivatives of 2,6-dimethyl-octane which are substituted in the 2-position with such monovalent atoms or groups as chloride, hydroxyl, alkoxy, acyloxy, bromide and the like.

It is well known that certain unsaturated derivatives of 2,6-dimethyl-octane which bear a hydroxyl or esterified hydroxyl group are valuable, particularly for their pleasant odors. Among these are the naturally-occurring alcohols, citronellol, geraniol, linalool and their esters. I have now found that various 2,6-dimethyl-octen-2-ols and their esters and ethers are likewise valuable for perfumery and can be produced from readily available and domestic raw materials.

As raw materials I employ acyclic dihydroterpenes which can be produced by methods described later from the bicyclic terpenes, alpha-pinene and beta-pinene, which are major constituents of American turpentines.

It is therefore an object of this invention to produce 2,6-dimethyl-octene-2-yl alcohols, esters, halides and ethers. It is a further object to convert readily available dihydroacyclic terpenes to acyclic products useful in perfumery.

Another object is to treat a diene hydrocarbon of the general formula

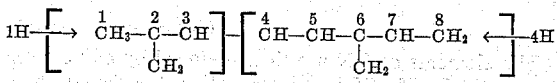

to produce mono-unsaturated compounds of the general formula

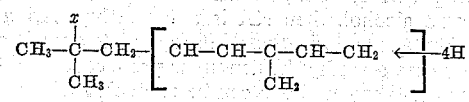

wherein $x$ is selected from the class consisting of hydroxy, halide, ether and ester groups.

Other desirable objects accomplished through use of my invention will be evident to those skilled in the art.

As is well known to the art, alpha-pinene can be pyrolized to yield alloocimene. Selective catalytic hydrogenation of alloocimene yields 2,6-dimethyl-2,4-octadiene as shown in the examples. Also, du Pont et al., Bulletin Societe Chemique de France, volume 5, pages 322–336 (1938) have shown that sodium reduction of alloocimene yields 2,6-dimethyl-2,5-octadiene. Also, it is well known to the art that beta-pinene yields myrcene on pyrolysis. As shown in the examples, myrcene can be selectively and catalytically reduced to produce the cis- and transforms of 2,6-dimethyl 2,6-octadiene, 2,6-dimethyl-2,7-octadiene and 2-methyl-6-methylene-2-octene.

Also, as is known, either alpha- or beta-pinene can be hydrogenated to produce pinane. Pinane yields 2,6-dimethyl-2,7-octadiene on pyrolysis, Pines, Journal of the American Chemical Society, volume 76, page 4412 (1954). In this case, if the pinene is optically active, then the diene produced is optically active also.

It is to be noted that 2,6-dimethyl-2,7-octadiene is also named 3,7-dimethyl-1,6-octadiene, but I prefer to refer here to all compounds as derivatives of 2,6-dimethyl-octane in order to maintain consistent nomenclature for ease of reading this disclosure.

The desired dienes can also be synthesized in other ways, but the methods disclosed above are operable and economic.

This invention is concerned with addition of a molecule which may be represented as HX to a diene, whereby addition takes place preferentially to the double bond involving the number 2 carbon atom.

Where X is the hydroxyl group, the addition of HX to the diene directly does not take place at all readily. If the diene is agitated for a prolonged period with, say, 25% phosphoric or sulfuric acids and at room temperature, some alcohols are formed, but in general the reaction is not a very satisfactory one.

Where X is acyloxy, the addition of HX is very easy with relatively strong organic acids with low molecular weight. In general, formic and acetic acids are quite satisfactory and cheap and are therefore preferred. When a stronger acid such as chloracetic or formic acid is used, no catalyst is necessary to promote the reaction, but with weaker acids, such as acetic acid, it is necessary to add a mineral acid catalyst to secure the reaction in a reasonably short time. In general, I prefer to employ sulfuric acid as catalyst since it is satisfactory and cheap, although I have found that acidic type ion exchange resins are also quite satisfactory and may be preferred if the reaction is to be conducted in continuous fashion. To produce 2,6-dimethyl-octen-2-yl esters, the diene, the organic acid of choice and, say, 0.25 to 1.0% sulfuric acid based on the weight of the organic acid employed are mixed at ambient temperature. If glacial acetic acid is employed, the mixture will be homogeneous and will not require stirring. However, if 85 or 90% formic acid is used, there will be two phases, and agitation is desirable throughout the reaction period. The temperature is not critical. Temperatures of 0° C. or lower tend to give slower reactions, and temperatures of 75° C. or above tend to cause polymerization, cyclization and other undesirable results, particularly if mineral acid catalysts are present. Since I find temperatures of 15–45° C. satisfactory, I ordinarily operate in this temperature range.

Even when acid catalysts are employed to bring about the addition of organic acid to the diene, the reaction is not rapid, nor is it complete. Although the individual reactivities of the dienes are slightly different, it will be found that under satisfactory operating conditions, perhaps 25 to 40% of the ester that will be eventually produced will be produced in about 15 hours and that about 75% of the total ester to be produced will be produced within around 36 to 50 hours.

Within about 3 to 5 days, the reaction will have practically ceased, and it will be found that about 20 to 35% of the diene will have been converted to ester. These times of reaction are, of course, only approximate and indicative of the type of reaction being discussed, and considerably wider variations may result under different conditions of time, temperature, catalyst variation, variation of organic acid being employed, etc.

The ratio of organic acid to diene is not critical, but the addition reaction is believed to be of the equilibrium type wherein hydrocarbon, the organic acid and ester take part. Very large molar excesses of organic acid will therefore cause a larger portion of diene to react, but such excesses of acids may be uneconomical. I therefore prefer to use 1 to 4 times as much acid by weight as diene employed and react these until a substantial amount of ester is present and then recover for recycling the unconsumed acid and hydrocarbon. The unconsumed acid and hydrocarbon will be found suitable for use in the next batch unless impurities present in the original hydrocarbon have increased in percentage to such an extent that repurification of the hydrocarbon is advisable. If a mineral acid is used as catalyst, it can be destroyed by adding slightly more than the stoichiometric quantity of base required to neutralize it prior to working up the reaction mixture. Neutralization of the catalyst will prevent the catalyst from causing the reversal of the reaction during the recovery step. The sodium salt of the organic acid present is usually employed for neutralizing the catalyst, although sodium hydroxide, soda ash, lime and the like are satisfactory.

The reaction mixture is distilled to recover hydrocarbon and organic acid, leaving the ester in the still as a high boiling fraction, or, if desired, the ester is also distilled. Recovered acid and hydrocarbon are treated with additional catalyst, and the process is repeated until the hydrocarbon is substantially completely converted to ester. The reaction mixture can, of course, be processed in other ways, such as by water washing, washing with aqueous soda ash, etc., but I prefer to recover the constituents of the reaction mixture by distillation as described above. However, if two phases are present, as when aqueous formic acid is used, it is convenient to separate the aqueous acid layer from the acidic oil layer and process them separately.

The esters produced can be distilled if desired to secure water white products of very pleasant odor. Either the crude ester or purified ester can be saponified if the alcohol is to be isolated. Saponification occurs easily at 90° C. or above with aqueous caustic soda or other alkali. The alcohols are steam volatile and can be separated and purified by steam distillation if desired.

The higher esters or esters of the weaker acids of the 2,6-dimethyl-octene-2-ols are less readily produced by direct esterification of the hydrocarbon and are most conveniently produced from the alcohols which can be esterified by any convenient procedure, such as by the use of acid anhydrides, acid chlorides or alcoholysis procedures, or by ester exchange, etc. Although intermediate esters, such as the propionate, isovalerate, etc., have pleasant odors, the higher esters such as the benzoate, phthalate, caprylate, etc., which have much weaker odors due to their lack of volatility, are most useful as fixatives and plasticizers rather than as perfumes, per se.

The lower ethers, such as the methyl ether of the 2,6-dimethyl-octen-2-ols, are readily produced by treatment of the hydrocarbon with the corresponding alcohol and mineral acid catalyst, such as sulfuric acid. Although the proportions are not critical, I prefer to employ about 1 to 4 times as much lower alcohol by weight as diene hydrocarbon. The temperature and time are not critical factors, but I find it convenient to react the mixture at 15–50° C. for about 10 hours to several days. The catalyst is then destroyed by addition of excess base, such as caustic soda, and the unreacted lower alcohol and diene hydrocarbon are recovered, suitably by distilaltion. The higher boiling ether is then collected as a more-or-less pure fraction, such as by continued distillation after lower boiling alcohol and hydrocarbon have been distilled off.

The higher ethers are not so readily produced by etherification of the hydrocarbon, but can be produced quite readily by reacting the sodium salt of the 2,6-dimethyl-octene-2-ols with an alkylating agent such as an alkyl halide or alkyl sulfate. Alternatively, an alkoxide can be produced from any desired alcohol and this can be reacted with a 2,6-dimethyl-octen-2-yl halide whose preparation is described below.

The 2,6-dimethyl-octen-2-yl chlorides and bromides are readily prepared by passing the corresponding anhydrous hydrohalide gas into the diene in about the stoichiometric proportions or less. Pressure facilitates the reaction, particularly when hydrogen chloride is used, but is not necessary. The absorption and reaction of hydrogen halide is exothermic, and while the temperature is not critical, I find it convenient to cool the reaction mixture, if necessary, to keep the temperature below, say, 75° C. The halide can be distilled for purification if desired, but it is usually pure enough for other conversions without additional purification. The halide can be hydrolized with aqueous bases to produce the corresponding 2,6-dimethyl-octen-2-ol or can be treated with alkoxides to produce ethers.

While the 2,6-dimethyl-octen-2-yl alcohols, ethers and esters possess very pleasant flowery odors, I have found that these and the halides possess the added important utility of serving as economic intermediates for synthesis of other compounds valuable in perfumery. A specific feature of this utility of my invention arises from selectively destroying the double bond involving the number 2 carbon atom and by an addition reaction, so that unsaturation involving the number 2 carbon atom can be regenerated at will, and, if desired, after the second and less-reactive double bond located elsewhere in the molecule has been converted by a separate reaction.

Thus, for example, 2,6-dimethyl-2,6-octadiene is subjected to an addition reaction of the type described above to produce 2,6-dimethyl-6-octen-2-yl alcohol, ester, halide or ether and then this derivative is ozonized to produce the methyl heptanone, alcohol, ester, halide or ether according to the reaction

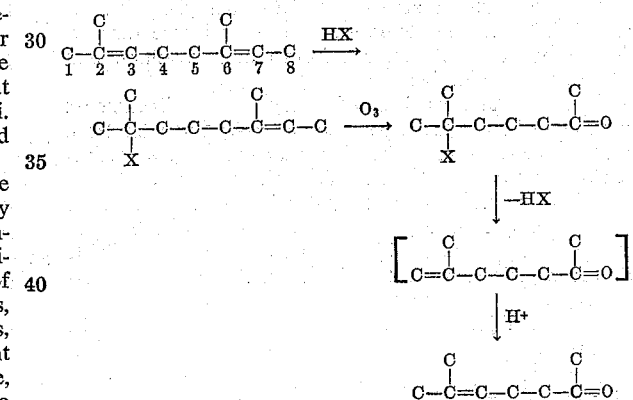

The elements of HX are then removed by any convenient method. If HX is a hydrohalide, the dehydrohalogenation can be accomplished by treatment of the methyl heptanone derivative with alkali, or if HX is water, an acid or an alcohol, then HX is removed by heating the methyl heptanone derivative with, say, 25% sulfuric acid. In either case a methyl heptenone is produced; specifically, 2-methyl-1-hepten-6-one can be recovered if the treatment is not severe, or if the treatment with acid is severe, then the double bond is moved one carbon atom to produce 2-methyl-2-hepten-6-one. This isomerization is readily brought about by boiling the 1-heptene with acids such as 10% sulfuric acid. The 2-methyl-2-hepten-6-one on treatment with acetylene in the presence of sodamide yields dehydrolinalool, which, on selective hydrogenation, yields linalool; see Simonsen, The Terpenes, vol. 1, page 61, second edition (1953). It is known to oxidize linalool with chromic acid to produce citral.

Another example of the utility of my invention involves the treatment of 2,6-dimethyl-7-octen-2-yl alcohol with ozone to cleave the unsaturation at the 7-position with formation of the hydroxy aldehyde. Dehydration of the hydroxy-aldehyde would give 2,6-dimethyl-1-hepten-7-al, accompanied by its isomerization product, 2,6-dimethyl-2-hepten-7-al, a product known to be valuable in perfumery.

It will be appreciated by those skilled in the art that if the double bond involving the number 2 carbon atom were not protected, it would itself react with ozone and the like. It is therefore apparent that protection of this double bond with addition-type reagents which can readily be removed to regenerate a double bond involving the number 2 carbon atom is valuable and provides very useful intermediates for further synthesis.

It is also desired to point out that any of the 2-yl unsaturated compounds produced by the present invention can be converted by hydrogenation and displacement reactions to form the 2,6-dimethyl-octane-2-ol or its derivatives, which are valuable chemicals for perfumery, as shown by copending application Serial No. 464,614, filed November 22, 1954.

While it has been shown throughout the foregoing that 2,6-dimethyl-2,y-octadienes are readily available and valuable raw materials for my invention, I wish to emphasize that the 2,6-dimethyl-1,y-octadienes if economically available would be of value likewise, since the double bond in this latter class of compounds involving the number 2 and number 1 carbon atoms is more reactive than is the double bond involving the y-position toward the specific addition reactions cited. By "y," I mean unsaturation at the 4-, 5-, 6 or 7-position. This same consideration applies to 2-methyl-6-methylene-1-octene. Thus, the addition of HX where X is chloride, bromide, hydroxy, alkoxy or acyloxy to a dihydroterpene of structure

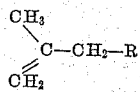

will result in formation of

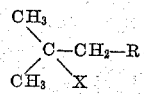

where R is hexenyl. Thus, suitable dienes include 2,6-dimethyl-1,y-octadienes possessing unsaturation involving the number 1 and number 2 carbon atoms, as well as the 2,6-dimethyl-2,y-dienes possessing unsaturation involving the number 2 and number 3 carbon atoms.

While at the present moment the 2,6-dimethyl-1,y-octadienes are not as economically available as the 2,6-dimethyl-2,y-octadienes, the former can be readily synthesized. Thus, they can be produced by removal of the elements of HX from the compounds described in this invention, the 2,6-dimethyl-y-octen-2-yl compounds. For example, dehydration of 2,6-dimethyl-7-octene-2-ol yields 2,6-dimethyl-1,7-octadiene, which in turn readily reacts with acetic acid in the presence of sulfuric acid to yield 2,6-dimethyl-7-octen-2-yl acetate. Also, 2,6-dimethyl-1,7-octadiene readily isomerizes to 2,6-dimethyl-2,7-octadiene on boiling with a strong mineral acid.

While I prefer to employ relatively pure dienes in conducting my invention, it is not necessary to do so. For example, a crude pinane pyrolysis mixture containing pinane, 2,6-dimethyl-2,7-octadiene and monoolefinic cyclization products can be treated with 85% aqueous formic acid, for example, under agitation whereby the pinane is unaffected, but both the acyclic diene and the monoolefinic cyclization products are partly esterified. Separation of the upper organic layer followed by its saponification and fractional distillation yields recovered hydrocarbons, 2,6-dimethyl-7-octene-2-ol and finally saturated cyclic alcohols in that order. Thus, impurities in the starting diene ordinarily can be recovered unreacted, or if they react, their derivatives can be readily separated from the desired derivative of the diene.

Chemical analysis of reaction products can be performed using conventional methods. Thus, the course of esterification of hydrocarbons can be followed by separating aliquots of the reacting mixtures, washing out free acids from the organic phase with water and/or aqueous bases, then determining the ester present by saponification. This reaction and other addition reactions such as hydrochlorination can also be followed analytically by determining disappearance of unsaturation as measured by bromine titration, for example. Once a reaction is performed and relatively pure products isolated, these can be employed as optical standards for infrared spectroanalysis. Also, as is well known, infrared analysis is particularly useful in measurement of the various functional groups, such as ester, ether, alcohol, etc., as well as types of unsaturation, i.e., the degree and symmetry of alkylation of the carbon atoms involved in the unsaturation. Through employment of such analytical procedures, all the various reactions can be followed qualitatively and quantitatively, and suitable modification of reaction conditions made to achieve the desired result most economically.

EXAMPLE 1

One mole of hydrogen was added to 1500 grams of myrcene, 95-98%, in the presence of 1.0% by weight of Rufert nickel catalyst at 85-100° C. under a hydrogen pressure of 40-60 p.s.i.g. The hydrogenation product was filtered to remove catalyst. Fractionation through an efficient column followed by infrared spectroanalysis of the fractions indicated that the hydrogenation product was 90-95% 2-methyl-6-methylene-2-octene, B.P.$_{100\ mm.}$, 100-101° C., $N_D^{25}$ 1.4439, $D_4^{25}$ 0.7669, and 8-10% 2,6-dimethyl,2,7-octadiene, B.P. $_{100\ mm.}$, 94.5° C., $N_D^{25}$ 1.4363, $D_4^{25}$ 0.7583.

EXAMPLE 2

One mole of hydrogen was added to 1500 grams of myrcene, 95-98%, in the presence of 0.2% by weight of 5.0% Pd on carbon at 25-35° C. under a hydrogen pressure of 40-60 p.s.i.g. The hydrogenation product was filtered to remove catalyst and fractionated through an efficient column at 100 mm. pressure. Infrared spectroanalysis of the fractions indicated that the hydrogenation product was: 65-70% trans-2,6-dimethyl-2,6-octadiene, B.P. $_{100\ mm.}$, 102° C., $N_D^{25}$ 1.4438, $D_4^{25}$ 0.7911 and 30-35% cis-2,6-dimethyl-2,6-octadiene, B.P. $_{100\ mm.}$ 104° C., $N_D^{25}$ 1.4500, $D_4^{25}$ 0.8055.

EXAMPLE 3

150 grams of alloocimene "A" having an extinction coefficient [$\alpha = E_{1\ cm.\ g./l.}$] of 334 at $\lambda$ max. of 277 m$\mu$ was hydrogenated at 25-30° C. in the presence of 0.2% by weight $PtO_2$ at a hydrogen pressure of 40-60 p.s.i. When 1 mole of $H_2$ had been added for each mole of alloocimene "A," the hydrogenation mixture was filtered to remove the catalyst and fractionated through an efficient column at 100 mm. pressure. Infrared and ultraviolet spectroanalysis indicated that the hydrogenated product was a mixture of 5 compounds. The physical properties of the compounds and composition of the mixture are listed in Table I. These are numbered in order of their increasing boiling points:

*Table I*

| Compound No. | Compound | B.P. at 100 mm., °C. | $N_D^{25}$ | S.G.$^{15.5}$ | Composition of hydrogenated product, percent |
|---|---|---|---|---|---|
| I | trans-2,6-dimethyl-4-octene. | 89 | 1.4169 | 0.735 | 15-17 |
| II | 2,6-dimethyl-3-octene. | 95 | 1.4231 | 0.748 | 7-9 |
| III | 2,6-dimethyl-2-octene. | 99 | 1.4268 | 0.753 | 16-18 |
| IV | 2,6-dimethyl-2,4-octadiene. | 107 | 1.4660 | 0.769 | 19-21 |
| V | unchanged alloocimene. | 125-128 | 1.5418 | 0.8081 | 38-40 |

EXAMPLE 4

One thousand grams of trans-2,6-dimethyl-2,6-octadiene and 1000 grams of glacial acetic acid containing 0.5% sulfuric acid were mixed and allowed to stand for 24 hours at 20 to 30° C. Ten grams of anhydrous sodium acetate was then added to destroy the sulfuric acid catalyst, and then most of the unreacted hydrocarbon and acetic acid were distilled off at atmospheric pressure. There remained a residue consisting largely of trans-2,6-dimethyl-6-octene-2-acetate, although some cis-form was present also. The ester was saponified by stirring it for ten hours with excess 35% potassium hydroxide solution. Fractional distillation of the separated saponified oil yielded 254 grams of 2,6-dimethyl-6-octene-2-ol boiling at 82.5 to 87.5° C. at 10 mm. pressure. It showed $N_D^{25}$ 1.4499 and $D_4^{25}$ 0.8499. Catalytic hydrogenation of this alcohol at 50 p.s.i.g. hydrogen pressure, 30° C. and platinum oxide catalyst gave 2,6-dimethyl-octane-2-ol.

Although the starting hydrocarbon consisted of the single isomer, the trans-form, the recovered hydrocarbon from this reaction also contained the cis-form. Further, it was evident from infrared spectra of fractions of the alcohol that two alcohols were present corresponding to cis- and trans-2,6-dimethyl-6-octene-2-ol.

The mixture of cis- and trans-alcohols possesses substantially the same infrared spectrum as the mixture of cis- and trans-alcohols secured by selective hydrogenation of 2-methyl-6-methylene-7-octene-2-ol, which can be isolated from the hydration products of myrcene; see copending application Serial No. 331,515, filed January 15, 1953. The selective reduction was accomplished by adding one mol of hydrogen to one mol of the alcohol using a palladium catalyst at about 30° C. and under a hydrogen pressure of about 30 p.s.i.g.

When the addition reaction was conducted exactly as above, but at 50 to 65° C., the mixture of alcohols obtained was somewhat richer in the cis-form of the 2,6-dimethyl-6-octene-2-ol. Also, the recovered hydrocarbon was somewhat richer in the cis-form, and it was found that the recovered hydrocarbon contained cyclodihydromyrcene.

When the reaction was repeated but at about 10° C., the yield was only about three-quarters as good as the yield at 20 to 30° C., but the alcohol was richer in the trans-form, although still containing some cis-2,6-dimethyl-6-octene-2-ol.

EXAMPLE 5

The experiment shown in Example 4 was repeated exactly except that cis-2,6-dimethyl-2,6-octadiene was employed. After saponification of the ester, the recovered alcohols were fractionated to give 233 grams of a mixture of alcohols identical with those of Example 4 but considerably richer in the cis-form when the reaction was run at 20–30° C. Again the alcohols boiled over the range 82.5 to 87.5° C. at 10 mm. pressure and possessed about the same refractive indices and densities as those shown in Example 4.

When this experiment using the cis-diene was repeated at 50° C. and higher temperatures, the mixtures of alcohols produced were considerably richer in the trans-form. The recovered hydrocarbons also contained cyclodihydromyrcene.

It is evident from the data of Examples 4 and 5 that both the cis- and trans-forms of 2,6-dimethyl-2,6-octadiene can be readily hydrated, and that during the course of the hydration, some conversion of cis to trans, and the reverse, occurs, particularly at higher temperatures. It is also evident that in this particular case, it is well to maintain temperatures of, say, 35° C. or lower in order to avoid cyclization of 2,6-dimethyl-2,6-octadiene to the cyclodihydromyrcene.

EXAMPLE 6

A mixture of the cis- and trans-forms of 2,6-dimethyl-2,6-octadiene was converted to the acetate at 20–30° C., as in Example 4. After neutralization of the catalyst, the acetic acid and hydrocarbon were recovered at atmospheric pressure. The crude ester remaining in the still was then fractionated to produce a mixture of the cis- and trans-forms of 2,6-dimethyl-6-octen-2-yl acetate boiling at 95.5 to 97° C., at 10 mm. pressure. The ester has a very pleasant perfume-type odor.

EXAMPLE 7

One thousand grams of 2-methyl-6-methylene-2-octene was mixed with an equal weight of glacial acetic acid containing 0.5% by weight sulfuric acid. After the mixture was allowed to stand for 24 hours, the catalyst was neutralized by the addition of 10 grams of anhydrous sodium acetate and then the unreacted hydrocarbon and acetic acid were distilled off at atmospheric pressure, leaving a residue of crude 2-methyl-6-methylene-octan-2-yl acetate. This product was then fractionated in vacuo to give the pure ester, boiling point 95–98° C. at 10 mm. All of the ester fractions were then saponified with potassium hydroxide solution and the recovered alcohols were then fractionated to give 274 grams of 2-methyl-6-methylene-octan-2-ol. This product boils at 84° C. at 10 mm. and possesses a spectrum showing that it contained an unsymmetrically-disubstituted methylenic unsaturation. Catalytic hydrogenation of the unsaturated alcohol over platinum oxide at 30° C. and under a pressure of 20 p.s.i.g. hydrogen pressure gave 2,6-dimethyl-octan-2-ol as determined by infrared comparison of the hydrogenated product with a known sample of the saturated alcohol.

In other experiments identical to the above, but run at 50° C. and above, the alcohol obtained on saponification of the ester was found to be a mixture of 2,6-dimethyl-6-octen-2-ol, both cis- and trans-forms, as produced in Examples 4 and 5, and 2-methyl-6-methylene-octan-2-ol. From such higher temperature experiments, the hydrocarbon recovered also contains varying amounts of 2,6-dimethyl-2,6-octadiene, both cis- and trans-forms, 2-methyl-6-methylene-2-octene and cyclodihydromyrcene. The 2-methyl-6-methylene-octan-2-ol and its ester had very pleasant odors.

EXAMPLE 8

Three hundred fifty grams of 2,6-dimethyl-2,7-octadiene, 95–98%, was hydrochlorinated by bubbling anhydrous HCl into the hydrocarbon at 20–30° C. When the hydrocarbon had absorbed 90 grams of HCl, the reaction was stopped. The hydrochlorination product was fractionated through an efficient glass packed column to yield 382 grams of 2 - chloro-2,6 - dimethyl-7 - octene, B.P.$_{10mm.}$ 71° C., $N_D^{25}$ 1.4410, $D_4^{25}$ 0.8747.

EXAMPLE 9

Two hundred grams of 2-chloro-2,6-dimethyl-7-octene, 200 ml. of water and 60 grams of Ca(OH)$_2$ were stirred at 100–105° C. for 15 hours. The excess lime was dissolved using aqueous HCl. One hundred seventy eight grams of oil was recovered. The oil was fractionated through an efficient glass packed column to give 15–20% hydrocarbons composed of a mixture of 2,6-dimethyl-1,7-octadiene and 2,6-dimethyl-2,7-octadiene, 5–10% 2-chloro - 2,6 - dimethyl-7-octene, 65–70% 2,6-dimethyl-7-octene-2-ol, B.P.$_{10\ mm.}$ 82.5° C., $N_D^{25}$ 1.4393, $D_4^{25}$ 0.8311, and 4% residue.

EXAMPLE 10

Five hundred grams of 2,6-dimethyl-2,4-octadiene, 500 grams of glacial acetic acid and 2.5 grams of 98% $H_2SO_4$ were mixed and allowed to stand for 4 days at 20–30° C. Five grams of anhydrous sodium acetate was added to neutralize the $H_2SO_4$. The mixture was then distilled to give acetic acid, unreacted hydrocarbon and a residue of crude ester. The crude ester was saponified using a 25% KOH solution. The saponification product was fractionated through an efficient column to give unchanged 2,6-dimethyl-2,4-octadiene, 76 grams of 2,6-dimethyl-4-octene-2-ol, B.P.$_{10\ mm.}$ 79–81° C., and 68 grams of polymeric residue.

IDENTIFICATION OF COMPOUNDS

Infrared spectroanalysis of the alcohol fraction showed that it was an unsaturated tertiary alcohol having a symmetrically-disubstituted ethylene bond as shown by the presence of the tertiary alcohol and symmetrically-disubstituted ethylenic bond absorptions in the spectrum at 8.7μ and 10.4μ, respectively. The catalytic addition of one mol of hydrogen to the unsaturated alcohol in the presence of 0.2% by weight of $PtO_2$ at 20–30° C. under a hydrogen pressure of 40–60 p.s.i.g. gave 2,6-dimethyl-octane-2-ol, as determined by comparison of the infrared spectrum of the reduction product with an authentic sample of that alcohol. From the above data, it is evident that the alcohol fraction is 2,6-dimethyl-4-octene-2-ol.

EXAMPLE 11

Two hundred fifty grams of 2,6-dimethyl-2,4-octadiene was hydrochlorinated by bubbling dry HCl into the hydrocarbon at 20–25° C. The reaction was exothermic and an ice bath was employed to keep the temperature below 25° C. When 65 grams of HCl had been added, the hydrochlorination product was hydrolyzed by stirring it with 350 ml. of water and 100 grams of $Ca(OH)_2$ at 100–105° C. for 16 hours. The excess lime was dissolved with aqueous HCl. The oil layer was separated to give 257 grams of hydrolyzed oil. The hydrolyzed oil was fractionated through an efficient column to give 25–30% hydrocarbons, mostly 2,6-dimethyl-2,4-octadiene, 65–70% alcohols, B.P.$_{10\,mm.}$ 80–92° C., and 8–10% higher boiling chlorides.

IDENTIFICATION OF COMPOUNDS

Infrared spectra of the alcohol fraction and refractionated fractions of the whole alcohol fraction shows that two isomeric alcohols are present.

The spectra are interpretable to prove that one is a tertiary alcohol containing unsaturation in the allylic position as shown by the characteristic allylic tertiary hydroxyl absorption at 8.6μ and the symmetrically disubstituted ethylenic bond absorption at 10.4μ. This alcohol is therefore 2,6-dimethyl-3-octene-2-ol. Its structure is confirmed by the fact that when hydrogenated at 40–60 p.s.i.g. at 20–30° C. with 0.2% by weight $PtO_2$, there is produced the known 2,6-dimethyl-octane-2-ol.

The spectrum of the other alcohol isomer is interpreted to prove that it is a secondary alcohol, absorption band at 9.8μ, and containing trisubstituted ethylenic unsaturation, absorption band at 12.3μ. This isomeric alcohol is therefore 2,6-dimethyl-2-octene-4-ol. This structure is further confirmed by hydrogenating it at 40–60 p.s.i.g. at 20–30° C. with 0.2% by weight $PtO_2$ whereby the known 2,6-dimethyl-octane-4-ol is produced and identified by means of its infrared spectrum.

It is evident from these data that the allylic chloride on solvolysis type hydrolysis yields both of the allylic alcohols theoretically possible.

EXAMPLE 12

Five hundred grams of 2,6-dimethyl-2,7-octadiene, 500 grams of glacial acetic acid and 2.5 grams of 98% $H_2SO_4$ were mixed and allowed to stand for 6 days at 20–30° C. Five grams of anhydrous sodium acetate was added to neutralize the $H_2SO_4$. The mixture was then distilled to give unreacted 2,6-dimethyl-2,7-octadiene, acetic acid and a residue of crude ester. The crude ester was saponified using a 25% KOH solution. Fractionation of the saponified oil gas 107 grams of 2,6-dimethyl-7-octene-2-ol as determined by infrared spectroanalysis. This product was identical with the alcohol as produced in Example 9.

EXAMPLE 13

Five hundred grams of 2,6-dimethyl-2,7-octadiene and 500 grams of formic acid (90%) were stirred at reflux, 105–108° C., for 8 hours. The oil layer was then separated and saponified using a 25% KOH solution. The saponified oil was fractionated through an efficient column. Infrared spectroanalysis of the fractions indicated that the saponified oil was 40–50% unchanged 2,6-dimethyl-2,7-octadiene, 15–20% hydrocarbon of unknown structure, B.P.$_{100\,mm.}$ 100–102° C., 10–15% 2,6-dimethyl-7-octene-2-ol, 5–8% alcohol of unknown structure, B.P.$_{10\,mm.}$ 93° C. The unknown hydrocarbon and alcohol probably result from cyclization.

EXAMPLE 14

Ten thousand grams of 2,6-dimethyl-2,7-octadiene produced by pyrolysis of 1-pinane, 10,000 grams of methanol and 50 grams of 98% $H_2SO_4$ were mixed and allowed to stand for 6 days at 20–30° C. Fifty grams of NaOH was then added to neutralize the $H_2SO_4$. The excess methanol and unreacted hydrocarbon were removed by distillation, leaving a residue of crude ether. Fractionation of the crude ether gave 1375 grams of 2-methoxy-2,6-dimethyl-7-octene, B.P.$_{10\,mm.}$ 70.5–71° C., $N_D^{25}$ 1.4294, $D_4^{25}$ 0.8134, $\alpha_D^{25}$ 10 cm.—8.16°, and 106 grams of residue.

IDENTIFICATION OF COMPOUNDS

Infrared spectroanalysis of the ether fraction showed that it contained a monosubstituted terminal methylene group, as shown by the presence of the characteristic monosubstituted terminal group absorption in the spectrum at 11.0μ. Catalytic addition of one mol of hydrogen to the unsaturated ether in the presence of 0.2% by weight of $PtO_2$ at 20–30° C. under a hydrogen pressure of 40–60 p.s.i.g. gave 2-methoxy-2,6-dimethyl-octane, B.P.$_{100\,mm.}$ 126.5–127.5° C., $N_D^{25}$ 1.4211, $D_4^{25}$ 0.8021, as determined by comparing the infrared spectrum of the hydrogenation product with spectrum of a known sample of 2-methoxy-2,6-dimethyl-octane; see Serial No. 464,614, filed October 22, 1954. The spectra were identical. From the above data it is evident that the unsaturated ether is 2-methoxy-2,6-dimethyl-7-octene.

EXAMPLE 15

Two hundred grams of 2,6-dimethyl-2,7-octadiene was hydrobrominated by bubbling dry HBr through the hydrocarbon at 20–30° C. When the hydrocarbon had absorbed 116 grams of HBr, the reaction was stopped.

Two hundred grams of the hydrobromination product, 200 ml. of water and 50 grams of $Ca(OH)_2$ were stirred at 100–105° C. for 12 hours. The excess lime was dissolved using aqueous HCl and 185 grams of oil was recovered. The oil was fractionated through an efficient column to give 8–10% hydrocarbons composed of a mixture of 2,6-dimethyl-1,7-octadiene and 2,6-dimethyl-2,7-octadiene, 5–8% 2-bromo-2,6-dimethyl-7-octene, B.P. 84–89° C. at 10 mm., 75–80% 2,6-dimethyl-7-octene-2-ol and 9% residue.

EXAMPLE 16

Five hundred grams of 2,6-dimethyl-7-octene-2-ol and 200 grams of 90% formic acid were stirred at 50° C. for 4 hours. The oil layer was separated and heated at atmospheric pressure to 150–175° C. The ester decomposed to give formic acid and hydrocarbon. The distillate was washed with a 10% NaOH solution to give 418 grams of acid-free hydrocarbon. Infrared spectroanalysis of the hydrocarbon indicated that it was 65–70% 2,6-dimethyl-1,7-octadiene and 30–35% 2,6-dimethyl-2,7-octadiene. Stirring a portion of the hydrocarbon mixture with a 25% $H_2SO_4$ solution at reflux for 2 hours gave a product containing 5–10% 2,6-dimethyl-1,7-octadiene and 90–95% 2,6-dimethyl-2,7-octadiene.

EXAMPLE 17

Two hundred grams of the hydrocarbon mixture prepared in Example 16, 65–70% 2,6-dimethyl-1,7-octadiene and 30–35% 2,6-dimethyl-2,7-octadiene, 200 grams of glacial acetic acid and 1.0 gram of 98% $H_2SO_4$ were mixed and allowed to stand for three days at 20–30° C. Two grams of anhydrous sodium acetate was added to neutralize the $H_2SO_4$. The mixture was then distilled at atmospheric pressure to give acetic acid, 148 grams of unreacted hydrocarbon mixture composed of 5–10% 2,6-dimethyl-1,7-octadiene, 90–95% 2,6-dimethyl-2,7-octadiene, and a residue of crude ester. The crude ester was saponified using a 25% KOH solution. The saponification product was fractionated to give a hydrocarbon mixture of the same composition as above, 82 grams of 2,6-dimethyl-7-octene-2-ol and 8 grams of residue.

EXAMPLE 18

Two hundred grams of the hydrocarbon mixture prepared in Example 16, 65–70% 2,6-dimethyl-1,7-octadiene and 30–35% 2,6-dimethyl-2,7-octadiene, was hydrobrominated by bubbling dry HBr through the hydrocarbon at 20–30° C. When the hydrocarbon had absorbed 116 grams of HBr, the reaction was stopped. Fractionation of the hydrobromination product through an efficient glass packed column and infrared spectroanalysis of the fractions indicated that the hydrobromination product was 10–15% hydrocarbon mixture composed of 10–15% 2,6-dimethyl-1,7-octadiene and 85–90% 2,6-dimethyl-2,7-octadiene, 85–87% 2-bromo-2,6-dimethyl-7-octene, B.P. 85° at 10 mm., $N_D^{25}$ 1.4605, $D_4^{25}$ 1.0616, $\alpha_D^{25}$ —9.17°, 10 cm. tube, and 3–5% higher boiling compounds.

EXAMPLE 19

Two hundred grams of 2-chloro-2,6-dimethyl-7-octene, 100 grams of KOH and 100 grams of methanol were heated at reflux, 70–75° C., for one hour. The reaction mixture was then diluted with 200 ml. of water. The oil layer was separated and dried to give 157 grams of dried oil. Fractionation of the oil through an efficient column followed by infrared spectroanalysis of the fractions indicated that it was 25–30% hydrocarbon composed of a mixture of 2,6-dimethyl-1,7-octadiene and 2,6-dimethyl-2,7-octadiene, 3–5% unchanged 2-chloro-2,6-dimethyl-7-octene and 70–75% 2-methoxy-2,6-dimethyl-7-octene.

The above examples will serve to illustrate the invention, and it will be seen therefrom that the present invention provides new compounds, many of which are, per se, useful in perfumery, and all of which are readily convertible to other compounds useful in perfumery. See my concurrently filed application Serial No. 576,794. By "useful in perfumery" is meant a use of the material where the purpose of such use is for its odor alone or in part when used either alone or with other materials to enhance a product odorwise, or to mask other odors, or both, or as a fixative or plasticizer for other materials used for such purposes.

In the specification and claims, the designations "1H," "4H" and "5H," together with their associated arrows, designate hydrogen atoms attached to carbon atoms within the respective brackets indicated by the arrows in such a manner as to provide a single carbon-carbon double bond between adjacent carbon atoms in each of the respective brackets.

Having described the invention, what is claimed is:

1. Compounds of the formula

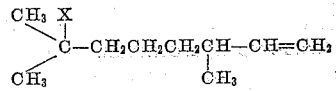

wherein $x$ is a radical selected from the class consisting of Cl-, Br-, a lower alkoxy radical, an acyloxy radical of a lower carboxylic acid and —OH.

2. 2,6-dimethyl-7-octene-2-ol.
3. 2,6-dimethyl-2-chloro-7-octene.
4. 2,6-dimethyl-2-bromo-7-octene.
5. The lower alkyl ethers of the alcohol of claim 2.
6. The lower carboxylic acid esters of the alcohol of claim 2.
7. The formate of the alcohol of claim 2.
8. The acetate of the alcohol of claim 2.
9. The process which comprises reacting a diene hydrocarbon of the general formula

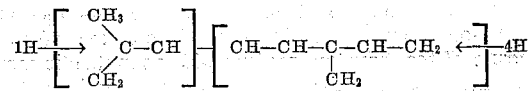

and HCl by intimately mixing the same, at a temperature in the range of about 0° C. to 75° C. under substantially anhydrous conditions and hydrolyzing the resulting product to produce a compound of the formula

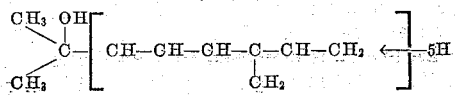

10. The process which comprises reacting a diene hydrocarbon of the general formula

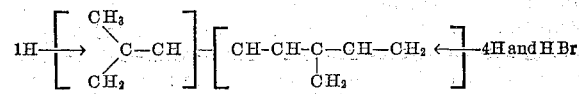

by intimately mixing the same, at a temperature in the range of about 0° C. to 75° C. under substantially anhydrous conditions and hydrolyzing the resulting product to produce a compound of the formula

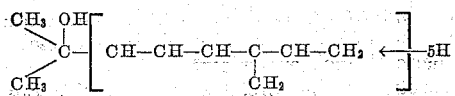

11. The process which comprises reacting 2,6-dimethyl-2,7-octadiene with a compound of the general formula HX wherein X is a radical selected from the class consisting of Cl-, Br-, a lower alkoxy radical and an acyloxy radical of a lower aliphatic carboxylic acid by intimately mixing the same at a temperature in the range of about 0° C. to 75° C. in the presence of an acid having an ionization constant at least as large as that of formic acid, to produce a compound of the formula

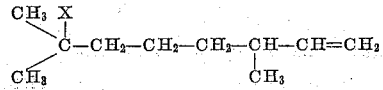

wherein $x$ has the same significance as above.

12. The process of claim 11 wherein HX is HCl.

13. The process which comprises reacting 2,6-dimethyl-2,7-octadiene with a compound of the general formula HX, wherein X is a radical selected from the class consisting of Cl-, Br, and an acyloxy radical of a lower aliphatic carboxylic acid at a temperature in the range of about 0° C. to 75° C. in the presence of an acid having an ionization constant at least as large as that of formic acid, and hydrolyzing the resulting addition product to produce 2,6-dimethyl-7-octene-2-ol.

References Cited in the file of this patent

UNITED STATES PATENTS

| | | |
|---|---|---|
| 2,467,330 | Milas | Apr. 12, 1949 |
| 2,609,388 | Knapp et al. | Sept. 2, 1952 |

OTHER REFERENCES

Simonsen et al.: "The Terpenes" (1953), vol. 1, pgs. 12, 23 and 38.